Patented July 21, 1936

2,048,152

UNITED STATES PATENT OFFICE 2,048,152

METHOD OF RECOVERING PRECIOUS METALS FROM MATTES

Edmund M. Wise, Westfield, and Raymond F. Vines, North Arlington, N. J., assignors to The International Nickel Company, Inc., New York, N. Y., a corporation of Delaware No Drawing. Application November 17, 1933, Serial No. 698,500

14 Claims. (Cl. 75—83)

The present invention relates to a method for recovering precious metals from mattes and more particularly to a method of recovering precious metals from nickel-copper mattes.

It is an object of the present invention to provide a method for effectively recovering precious metals, especially platinum metals from mattes, particularly nickel-copper mattes.

It is another object of the invention to provide a method of recovering precious metals from mattes which can be carried into practice in a practical manner on an industrial scale.

It is a further object of the invention to produce a method of recovering precious metals from mattes which is relatively simple and which is economical.

It is still a further object of the invention to provide a process of recovering precious metals from nickel-copper mattes which are to be utilized in the direct production of nickel-copper alloys without the individual separation of metallic nickel and of metallic copper.

It is also within the contemplation of the invention to provide a method of recovering precious metals from mattes which is capable of being applied to the standard procedure of treating nickel-copper mattes including those treated according to the Orford principle.

Other objects and advantages of the present invention will become apparent from the following description:

Broadly stated, the invention contemplates the discovery that a compact segregate carrying a substantial part of the precious metals contained in a matte can be produced by the addition of special segregating agents to the molten matte. The precious metal-containing segregate is heavier than the molten matte and sinks to the bottom thereof as a compact mass. The compact segregate carrying a substantial proportion of the precious metals of the matte separates as a phase which can be easily isolated and recovered and which does not require the crushing and grinding of the remaining matte or any special treatment thereof. In certain instances, diluent or blending agents can be incorporated with or used in conjunction with the segregating agent and added to the molten matte. It has also been found that additional agents can be added with the segregating agent to facilitate and accentuate the recovery of precious metals from the molten matte and to alter the melting point of the segregate.

For the purpose of giving those skilled in the art a better understanding, the following specific and illustrative examples will be given:

Example No. 1

A nickel-copper matte is produced in any approved manner. Thus, the nickel-copper ore may be roasted, smelted in reverberatory and then blown in a converter. Generally, this molten matte on leaving the converter has a temperature of about 1260° C.

The segregating element is introduced into the molten matte, preferably as the matte is being poured from the converter in a ladle. It has been discovered that silicon functions very effectively as a segregating element and causes an exothermic reaction which begins at about 1100° C. In this connection, it is to be noted that it is generally desirable to heat the molten matte to about 1100° C. prior to adding the segregating element in order to secure a compact segregate. If excessive temperatures are employed, losses of the segregating element may be incurred and a less compact segregate is apt to be produced.

In the foregoing procedure silicon may be added as the element or as a silicide. Thus, when a nickel-copper matte is treated it is preferred to use nickel silicide or a silicide of nickel and copper. If desired, ferro-silicon may be used except in those instances wherein the introduction of the associated iron is undesired.

The compact segregate consisting largely of silicon and nickel plus precious metals, particularly platinum metals, is present as a distinct phase. For instance, under the foregoing conditions the segregate sinks in the mass of molten matte and forms a molten bottom. This molten bottom may be tapped off and the precious metals contained therein may be recovered. In those instances where the segregate has a higher melting point than the matte, the entire mass can be partially cooled and the molten matte may be poured off and the solid segregate containing precious metal is allowed to remain in the vessel for recovery. It is also possible to permit the entire mass to solidify, preferably in a conical container. The segregate constitutes the apex of the cone and may be easily cracked off from the bottom and recovered. It will thus be observed that the segregate may be recovered in various practical ways which conform to conventional metallurgical procedures.

The residual matte remaining after the precious metal segregate has been recovered can be treated in the usual manner to obtain nickel, copper and any other metals which are present. Thus, the residual matte can be converted into an oxide and the oxide can be reduced to form a nickel-copper alloy. In certain instances, the residual matte can be treated to produce metallic copper and metallic nickel. It has been found that any residual gold and silver will be largely associated with the metallic copper and may be recovered therefrom. Similarly, it has been found that residual platinum metals will be largely associated with the metallic nickel and may be recovered therefrom. Of course, the percentage of precious metals remaining in the residual matte after the original matte has been treated by the present method, is substantially lower than in customary mattes heretofore obtained. In other words, it is possible to make an effective recovery of precious metals from mattes by a simple procedure and to recover values which have heretofore been lost.

In the foregoing example the nickel-copper matte had the following composition:

| Element | Per cent |
|---|---|
| Nickel | 48.68 |
| Copper | 30.69 |
| Iron | 0.39 |
| Sulphur | 19.75 |

In the treatment of the molten nickel-copper matte approximately 2% of silicon was used. It has been found that the weight of the bottom derived from the treatment of the matte with silicon increases directly with the amount of silicon added in excess of about ½% and the segregated bottom amounts to 10% of the charge when about 2% of silicon is added to the charge. The whole charge was allowed to cool and solidify and the segregate bottom was cracked off.

The analysis of the segregate bottom produced by the foregoing example is as follows:—

Schedule

| Element | Percent |
|---|---|
| Copper | 6.68 |
| Nickel and cobalt | 76.00 |
| Iron | 0.86 |
| Sulphur | 1.66 |
| Silicon | 13.71 |
| Balance including total precious metals recovered | 1.09 |

The calculations based on analysis showed that the segregate recovered the following percentages of precious metals from the original matte:

Schedule

| Element | Percent |
|---|---|
| Platinum | 93.2 |
| Palladium | 45.4 |
| Gold | 12.7 |
| Silver | 0.45 |
| Other platinum metals | 40.0 |

*Example No. 2*

A nickel-copper matte was treated in molten condition with phosphorus as the segregating element. In this instance, the matte had the following composition and was treated at a temperature of about 1300° C.

Schedule

| Element | Percent |
|---|---|
| Nickel plus cobalt | 43.0 |
| Copper | 37.0 |
| Iron | .35 |
| Sulphur | 17.4 |

It is preferred to add phosphorus in the form of a phosphide, such as copper phosphide. In the foregoing treatment about 2% of phosphorus is added as "15% phosphor copper". The segregated bottom constituted about 10% of charge and can be varied by varying the amount of phosphorus added to the charge.

The analysis of the foregoing bottom gave the following results:

Schedule

| Element | Percent |
|---|---|
| Copper | 19.17 |
| Nickel and cobalt | 64.52 |
| Iron | 0.50 |
| Sulphur | 8.55 |
| Phosphorus | 6.92 |
| Balance including precious metals recovered | 0.34 |

In calculating the analytical data on the precious metals recovered from the matte by the segregate bottom, it was found that the following percentages of precious metals were recovered:

Schedule

| Element | Percent |
|---|---|
| Patinum | 42.1 |
| Palladium | 18.8 |
| Gold | 8.9 |
| Silver | 3.03 |
| Other platinum metals | 20.8 |

The residual matte can be treated as described hereinabove.

It has been discovered that boron can be used as a segregating element in place of silicon or of phosphorus. Due to the relatively high cost of boron, it is generally preferred to use silicon or phosphorus. In any event, however, it is to be observed that boron can be used to obtain the results of the present method. In certain instances, it may be desirable to use boron in conjunction with silicon and/or phosphorus or it may be desirable to use a mixture of silicon and phosphorus.

With respect to the treatment of mattes by the present method, it has been found that it is usually preferred to utilize a matte containing no more sulphur than is required to form $Cu_2S$ and $Ni_3S_2$ due to the fact that the low sulphur mattes require a lesser quantity of silicon or the like to produce a segregate of desirable and convenient size. In mattes consisting almost wholly of nickel sulphide it is particularly desirable to have a deficiency of sulphur.

It has also been observed that a very high iron content in the matte tends to make the segregate rather nodular and requires a higher treating temperature.

It is to be observed that the present invention provides a method which is particularly suitable for the treatment of Bessemer matte in order to effect the removal of the bulk of platinum metals prior to subsequent refining steps.

It is also to be noted that the present invention can be applied to mattes in which nickel is negligible and in which case the segregate bottom consists largely of copper silicide containing precious metals.

In practicing the present invention, it may be noted that the treatment described for removing precious metals from matte may be repeated to effect still further recoveries of precious metals. Furthermore, it may be desirable under some circumstances to agitate the mixture during part of the cooling period to expedite the approach to equilibrium between the matte and the segregate and to effect more complete recoveries of the precious metals. For the same reason, it may also be desirable to maintain the temperature of the molten matte and segregate constant for a time during the treating process.

We claim:

1. The method of recovering precious metals from mattes which comprises treating a matte in a molten condition with a non-metallic segregating agent of the group consisting of silicon, phosphorus and boron adapted to segregate precious metals and recovering the segregate containing said precious metals from said molten matte.

2. The method of recovering precious metals from mattes which comprises establishing a pool containing a molten matte at a temperature in excess of about 1000° C., introducing a non-metallic segregating element of the group consisting of silicon, phosphorus and boron into said molten matte adapted to form a segregate of precious metals and recovering said segregate containing precious metals from said molten matte.

3. The method of recovering precious metals from mattes which comprises establishing a pool containing a molten matte at a temperature in excess of about 1000° C., treating said molten matte at a temperature of about 1100° C.–1400° C. with a non-metallic segregating element of the group consisting of silicon, phosphorus and boron adapted to form a segregate with precious metals, and recovering said segregate containing said precious metals.

4. The method of recovering precious metals from mattes which comprises establishing a pool containing a molten matte at a temperature in excess of about 1000° C., treating said molten matte at a temperature of about 1100° C.–1400° with a non-metallic segregating element of the group consisting of silicon, phosphorus and boron adapted to form a segregate with precious metals, permitting said segregate to settle to the bottom of said pool and separating said segregate from said matte to recover the segregated precious metals.

5. The method of recovering precious metals from nickel-copper mattes which comprises treating a nickel-copper matte in a molten condition with a non-metallic segregating agent of the group consisting of silicon, phosphorus and boron adapted to segregate precious metals and recovering the segregate containing said precious metals from said molten nickel-copper matte.

6. The method of recovering precious metals from nickel-copper mattes which comprises establishing a pool containing a molten nickel-copper matte at a temperature in excess of about 1000° C., introducing a non-metallic segregating element of the group consisting of silicon, phosphorus and boron into said molten nickel-copper matte adapted to form a segregate of precious metals and recovering said segregate containing precious metals from said molten nickel-copper matte.

7. The method of recovering precious metals from nickel-copper mattes which comprises establishing a pool containing a molten nickel-copper matte at a temperature in excess of about 1000° C., treating said molten nickel-copper matte at a temperature of about 1100° C.–1400° C. with a non-metallic segregating element of the group consisting of silicon, phosphorus and boron adapted to form a segregate with precious metals, and recovering said segregate containing said precious metals.

8. The method of recovering precious metals from nickel-copper mattes which comprises establising a pool containing a molten nickel-copper matte at a temperature in excess of about 1000° C., treating said molten nickel-copper matte at a temperature of about 1100° C.–1400° C. with a non-metallic segregating element of the group consisting of silicon, phosphorus and boron adapted to form a segregate with precious metals, permitting said segregate to settle to the bottom of said pool and separating said segregate from said nickel-copper matte to recover the segregated precious metals.

9. The method of recovering precious metals from a nickel-copper matte which comprises producing a molten nickel-copper Bessemer matte having a temperature of about 1200° C., introducing a non-metallic segregating element of the group consisting of silicon, phosphorus and boron adapted to form a segregate containing precious metals, permitting said segregate to sink to the bottom of the molten mass of the nickel-copper matte and separating said segregate containing precious metals from said matte.

10. The method of recording precious metals from nickel-copper mattes which comprises establishing a pool containing a molten nickel-copper matte at a temperature in excess of about 1000° C., treating said molten nickel-copper matte at a temperature of about 1100° C.–1400° C. with a solid non-metallic element of the group consisting of silicon, phosphorus and boron and adapted to form a segregate with precious metals, slowly cooling the thus treated nickel-copper matte, and recovering said segregate containing said precious metals.

11. The method of recovering precious metals from mattes which comprises establishing a pool containing a molten matte at a temperature in excess of about 1000° C., introducing a solid non-metallic segregating element of the group consisting of silicon, phosphorus and boron into said molten matte to form a segregate of precious metals, holding said molten matte at a temperature above the melting point of the segregate to permit equilibrium to be attained, and recovering said segregate containing precious metals from said matte.

12. The method of recovering precious metals from mattes which comprises establishing a pool containing a molten matte at a temperature in excess of about 1000° C., treating said molten matte at a temperature of about 1100° C.–1400° C. with a solid non-metallic segregating element of the group consisting of silicon, phosphorus and boron and adapted to form a segregate with precious metals, stirring said molten matte after the addition of said segregating element, and recovering said segregate containing said precious metals.

13. The method of recovering precious metals from mattes which comprises establishing a pool containing a molten matte at a temperature in excess of about 1000° C., introducing a solid non-metallic segregating element of the group consisting of silicon, phosphorus and boron in successive portions into said molten matte to form a segregate of precious metals, and recovering said segregate containing precious metals from said matte.

14. The method of recovering precious metals from mattes which comprises treating a matte in a molten condition with a solid non-metallic segregating agent of the group consisting of silicon, phosphorus and boron and adapted to segregate precious metals and recovering the segregate containing said precious metals from said matte and repeating the aforesaid operations on the treated matte.

EDMUND M. WISE.
RAYMOND F. VINES.